March 24, 1959

E. R. INGERSOLL ET AL 2,879,389

MAGNETIC PULSE GENERATOR

Filed Dec. 28, 1955

*INVENTORS.*
EUGENE R. INGERSOLL
RICHARD R. TRAUTWEIN
BY VIRGIL W. WALL

*William R. Lane*

ATTORNEY

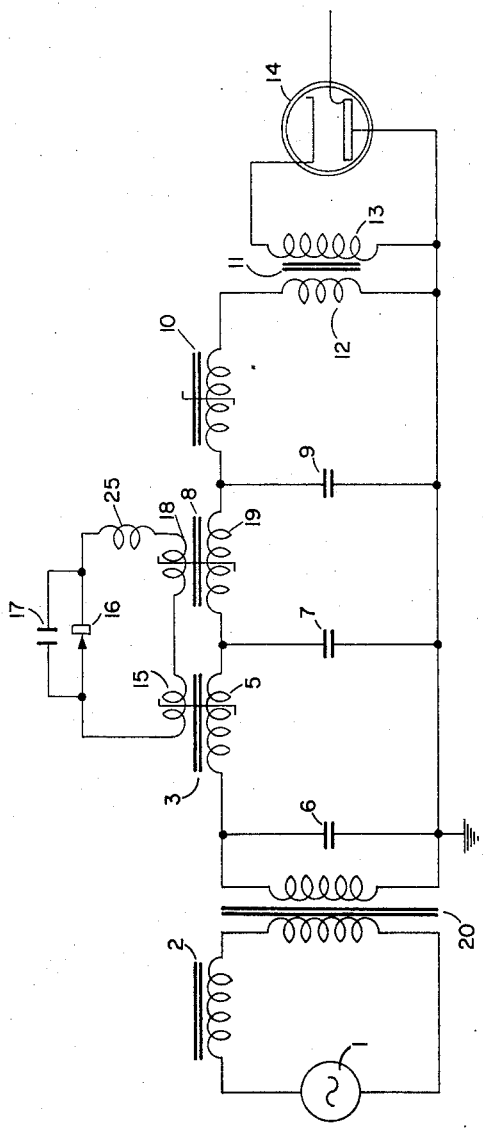
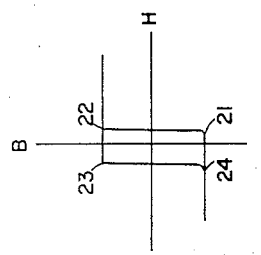
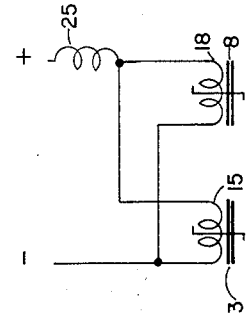
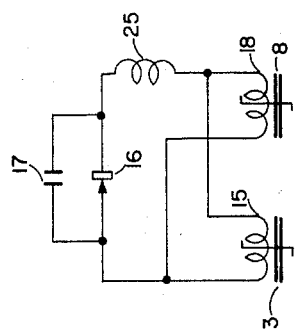
INVENTORS.
EUGENE R. INGERSOLL
RICHARD R. TRAUTWEIN
BY VIRGIL W. WALL
ATTORNEY

United States Patent Office 2,879,389
Patented Mar. 24, 1959

2,879,389

MAGNETIC PULSE GENERATOR

Eugene R. Ingersoll, Whittier, Richard R. Trautwein, Glendale, and Virgil W. Wall, Downey, Calif., assignors to North American Aviation, Inc.

Application December 28, 1955, Serial No. 555,846

17 Claims. (Cl. 250—36)

This invention pertains to a magnetic pulse generator, and in particular to a magnetic pulse generator for generating pulses of radio frequency energy for use in a radar transmitter.

This application is a continuation-in-part of the patent application entitled "Magnetic Pulse Generator," Serial No. 277,196, filed March 18, 1952, by Eugene R. Ingersoll, Richard R. Trautwein and Virgil W. Wall, now abandoned.

Pulse generators which are used in radar transmitters customarily use electron tubes, and in particular gas tubes, as rapidly acting switching devices. Electron tubes inherently have poor reliability and short life. Most electron tubes require external power supplies for their proper operation.

Prior to this invention, pulse modulators required a pulse forming network utilizing air cored inductors together with capacitors to form an artificial transmission line which has a desired characteristic impedance. The artificial transmission line formed the pulse into a shape which was satisfactory for pulsing a magnetron in a radar transmitter. If the characteristic impedance of the artificial transmission line did not exactly match the impedance of the magnetron during its oscillating period, the pulse was reflected back into the artificial transmission line, then reflected into the magnetron where it caused spurious modifications of the radio frequency envelope. In no sense could the operation of the pulse forming network be said to depend upon the characteristics of the magnetron. The artificial transmission line merely formed a voltage pulse into a desired shape for pulsing the magnetron and had the additional reflection disadvantage as mentioned above. Naturally, adjustment of the characteristic impedance of the artificial transmission line was very critical and was time-consuming. The artificial transmission line was very bulky because the electrical components had to be of a distributed nature.

This invention contemplates a device which overcomes the disadvantages of conventional radar pulse generators, uses a more efficient and reliable switching mechanism and requires a minimum of external voltage sources. Saturable elements such as saturable reactors or inductors, saturable capacitors or saturable resistors offer a satisfactory solution to the switching problems. In the preferred embodiment of this invention, saturable reactors are used as a switching mechanism. Saturable reactors are very reliable, have a long life, and have no need for a multiplicity of external power sources. When saturable reactors are used as a switching mechanism in the circuit to be presently described, an artificial transmission line for use as a pulse forming network is not required. Thus, it may be seen that a considerable portion of the bulky equipment required in conventional pulse generators is not required in this invention. The pulse generator of this invention is compact and light weight, and is ideally suited for aircraft use.

It is therefore an object of this invention to provide a magnetic pulse generator which uses saturable elements as a switching mechanism.

It is another object of this invention to provide a radio frequency pulse generator which is of light weight, is reliable, has long life, and requires only one power source.

It is another object of this invention to provide a switching mechanism for pulse generators which is reliable, and has long life.

It is another object of this invention to provide a magnetic pulse modulator which forms a voltage pulse adapted for pulsing a magnetron radio frequency generator.

It is another object of this invention to provide a magnetic pulse generator which shapes and times a voltage pulse using only saturable reactors and lumped constant condensers together with a magnetron.

It is a further object of this invention to provide a magnetic pulse modulator utilizing condensers and saturable reactors in cascade for pulse modulating a magnetron adapted for use in a radar system.

It is another object of this invention to provide a magnetic pulse modulator utilizing both biased and unbiased saturable reactors in combination with condensers for pulse modulating a magnetron.

It is still another object of this invention to provide a magnetic pulse modulator utilizing biased and unbiased saturable reactors in combination with condensers and a novel biasing circuit for pulse modulating a magnetron.

It is a further object of this invention to provide a magnetic pulse generator for generating radio frequency pulses utilizing biased and unbiased saturable reactors in combination with condensers and an additional winding on one of said saturable reactors to introduce a voltage at the pulsing frequency into the circuit with a minimum of parts.

It is a further object of this invention to provide a magnetic pulse modulator for modulating a magnetron used in a radar system utilizing saturable reactors in combination with condensers and a self-biasing circuit together with an additional winding upon one of said saturable reactors for introducing voltage at the pulsing frequency, having the biasing coils of each separate saturable reactor connected together with a polarity which will eliminate positive pulse peaks.

Other objects of invention will become apparent from the following description taken in connection with the accompanying drawings, in which:

Fig. 1 is a circuit diagram of a preferred embodiment of this invention;

Fig. 2 is a circuit diagram of a second embodiment of this invention;

Fig. 3 is a circuit diagram of an alternative biasing circuit of this invention;

Fig. 4 is a circuit diagram of an alternative bias connection for this invention;

And Fig. 5 is a plot of a typical square-shaped hysteresis loop.

In Fig. 1, alternating voltage supply 1 is of the desired pulse frequency. Inductor 2 is provided to form a resonant circuit at the pulse frequency with the reactances reflected across saturable reactor 3. Saturable reactor 3 has three windings 4, 5 and 15. Winding 4 will be designated the primary winding because it is the source of power. Winding 15 is a bias winding for maintaining the flux density in saturable reactor 3 at the lower knee 24 of the hysteresis loop as shown in Fig. 5. Winding 5 of saturable reactor 3 is designated the active winding. Active winding 5 of saturable reactor 3 is connected in series with active winding 19 of saturable reactor 8 and with the active winding of saturable reactor 10 as well as with primary winding 12 of pulse transformer 11. Condenser 6 is connected between one end of active coil 5 and ground as shown in Figs. 1 and 2. Condenser 7 is connected between ground and the junction between active coil 5 and active coil 19. Condenser 9 is connected between ground, and the junction between active coil 19 and the active coil of saturable reactor 10. Condensers 6, 7 and 9 and saturable reactors 3, 8 and 10 form a cascade circuit with series reactors and shunt condensers. The circuit would also be operable with series condensers in place of the series reactors and shunt reactors in place of the shunt condensers. Secondary winding 13 of pulse transformer 11 is connected between the cathode of magnetron 14 and ground. Bias coil 18 is polarized in the proper sense and interconnected with winding 15 to prevent positive pulses from reaching magnetron 14. Rectifier 16 rectifies the voltage induced in bias winding 15 of saturable reactor 3 and winding 18 of saturable reactor 8, while condenser 17 filters the resultant direct current voltage to supply a bias voltage of the proper magnitude, polarity and time sequence to saturable reactors 3 and 8. Inductor 25 is provided to form a resonant circuit at the pulse frequency with the reactances reflected into the bias circuit through saturable reactors 3 and 8. Alternatively, bias windings 15 and 18 may be connected in parallel as shown in Fig. 3.

Alternatively, the pulse frequency voltage of voltage supply 1 may be supplied to the circuit by a separate transformer 20 whose secondary voltage is applied across condenser 6 as shown in Fig. 2.

Alternatively, the bias voltage may be supplied from an external precision regulated direct current supply voltage as shown in Fig. 4 to windings 15 and 18 either in series or parallel by means of rectifier 16 and the primary winding 4 of saturable reactor 3 as shown in Fig. 1, or by means of rectifier 16 and a separate external transformer as shown in Fig. 2.

In operation, the voltage supplied at the pulse frequency from winding 4 to winding 5 of saturable reactor 3 in Fig. 1, or from transformer 20 in Fig. 2, is applied across condenser 6. Winding 19 of saturable reactor 8, the active winding of saturable reactor 10, and primary winding 12 of pulse transformer 11 have negligible impedances at the pulsing frequency of voltage supply 1. When condenser 6 is properly charged, saturable reactor 3 saturates, offering negligible impedance to the flow of current from condenser 6 to condenser 7. Saturable reactor 3 does, however, still have a measurable inductance which determines, together with the capacity of condensers 6 and 7, the length of time required to transfer all of the charge from condenser 6 to condenser 7. If the inductance of saturable reactor 3 remained at the low value, the charge on condenser 7 would be retransferred to condenser 6 due to the oscillatory nature of the circuit. The charge on condenser 7 is not retransferred to condenser 6 because the operating condition of saturable reactor 3 is moved into the steep portion of the hysteresis loop. When the voltage builds up on condenser 7, saturable reactor 8 saturates causing the charge to be transferred from condenser 7 to condenser 9 by the same kind of operation which transferred the charge from condenser 6 to condenser 7. The length of the voltage pulse appearing across condenser 9 is determined by the inductance of saturable reactor 8 when saturable reactor 8 is operating in the horizontal portion of the hysteresis curve, and by the capacitance of condensers 7 and 9. The charge is transferred from condenser 9 to primary winding 12 of pulse transformer 11 by the saturation of saturable reactor 10. The voltage pulse transferred to primary winding 12 is of shorter duration than the voltage pulse appearing across condenser 9. Magnetron 14 loads down the voltage pulse appearing across primary winding 12 by means of pulse transformer 11 through secondary winding 13. The current flowing through primary winding 12 of pulse transformer 11 is a pulse of the general shape of a clipped, half sine wave. The voltage across magnetron 14 increases until magnetron 14 starts to oscillate. When magnetron 14 starts to oscillate, the impedance of magnetron 14 drops abruptly, causing the voltage across magnetron 14 to be clipped. The voltage pulse applied across magnetron 14 is therefore a clipped sine wave with approximately a flat top. The radio frequency pulse depends upon the current flow in magnetron 14 and is shaped approximately as a clipped, half sine wave with a slightly rounded top. It may be seen from the foregoing that the shape of the radio frequency pulse produced by this invention depends upon the cooperation between the saturable reactors and condensers, and magnetron 14. The impedance of the entire circuit looking from pulse transformer 11 dos not have to be equal to the impedance of magnetron 14. In this invention no reflections occur.

The combination of saturable reactors 3, 8 and 10 together with condensers 6, 7 and 9 form a cascade circuit which has saturable reactors in series and capacitors in shunt with a condenser input, and a saturable reactor output, which, when combined with magnetron 14 pulses magnetron 14 without the necessity of preforming the pulse with a distributed constant pulse forming network.

In gas or vacuum tube pulse modulators the input power will increase if the magnetron is shorted, thus damaging the modulator. This invention is composed only of reactive elements. Therefore, the modulator will not be damaged if secondary winding 13 is shorted, but the input power will merely decrease.

Thus, this invention overcomes the disadvantages of prior pulse generators. The circuit constants are lumped, the pulse forming network is eliminated, and the inductors have ferromagnetic cores, making a compact modulator. There are no vacuum or gas tubes to be damaged or to burn out, making a reliable generator with long life. There is no necessity for auxiliary power supplies. Spurious interference is eliminated in this invention because there is no necessity for a transmission line type, pulse forming network. A pulse generator of the type contemplated by this invention is well adapted for use in aircraft radar devices.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In a pulse generator utilizing saturable reactors, means for biasing said saturable reactors comprising a plurality of bias windings each individual to one of said reactors and each wound upon a common core with the saturable reactor to be biased thereby, and a rectifier and an inductor connected in series across said bias windings whereby voltages induced into said bias windings from said saturable reactors are rectified by said rectifier, causing direct current to flow, biasing said saturable reactors.

2. In combination with a saturable reactor which is used as a switching mechanism in an inductance-capacitance loop, bias means comprising a rectifier, an inductor, a bias winding wound on a common core with said saturable reactor, said rectifier and said inductor being connected in series across said bias winding of said saturable reactor whereby, whenever an alternating voltage having a predetermined time sequence and amplitude is induced in said bias winding, a current is generated in said bias winding which has a desired predetermined polarity, amplitude and time sequence for biasing said saturable reactor.

3. A magnetron radio frequency pulse generator comprising a plurality of condensers, a plurality of saturable elements, the number of said saturable elements being equal in number with said condensers, said condensers and said saturable elements being connected in cascade and having predetermined capacitance and inductance values, a pulse transformer, a magnetron, electrical energy means, voltage biasing means, said electrical energy means being connected to the input of said cascade circuit, said voltage biasing means being connected to at least one said saturable element, said pulse transformer being connected between the output of said cascade circuit and the input of said magnetron.

4. A radio frequency pulse generator comprising a plurality of saturable reactors, a plurality of condensers, the number of said saturable reactors and said condensers being equal, said saturable reactors each having a first winding, a magnetron, said first windings of said saturable reactors connected in series to form together with said condensers connected in shunt, a cascade circuit having a condenser input and saturable reactor output, a pulse transformer coupling said output to said magnetron the first and the second said saturable reactors each having a second winding, voltage means of a predetermined pulsing frequency connected to the input of said cascade circuit, and bias voltage means of a predetermined magnitude and polarity connected to said second windings of said first and second saturable reactors whereby said magnetron is pulsed with the proper wave shape.

5. A device as recited in claim 4 in which said voltage means of a predetermined pulsing frequency comprises a voltage source, a resonating inductor, and a third winding upon the core of said first saturable reactor, said voltage source being connected in series with said resonating inductor and said third winding.

6. A device as recited in claim 4 wherein said voltage means of a predetermined pulsing frequency comprises a voltage source, a resonating inductor, and a voltage transformer, said voltage source and said resonating inductor being connected in series with the primary winding of said voltage transformer, the secondary of said voltage transformer being connected across said input condenser.

7. A device as recited in claim 4 in which said bias voltage means is a high precision direct current supply.

8. A device as recited in claim 4 in which said bias voltage means comprises a rectifier and an inductor connected in series, and in which said second winding of said first saturable reactor is connected in series with said second winding of said second saturable reactor and said series-connected inductor and rectifier, whereby voltages induced into said second windings from said first windings of said saturable reactors are rectified and operate to supply direct current voltages for biasing said first and said second saturable reactor.

9. A device as recited in claim 4 in which said bias voltage means comprises a rectifier and an inductor, said second winding of said first saturable reactor being connected in parallel with said second winding of said second saturable reactor, said rectifier being connected in series with said inductor across said second windings whereby voltages induced from said first windings of said saturable reactors into said second windings are rectified by said rectifier to cause direct current to flow to bias said first and said second saturable reactor.

10. A radio frequency pulse generator comprising a plurality of saturable reactors, the first of said saturable reactors having a first, second and third winding, the second said saturable reactor having a first and second winding, a plurality of condensers, the number of said condensers being equal to the number of said saturable reactors, a pulse transformer, a magnetron, said first windings of said saturable reactors and said condensers being connected to form a cascade circuit with said saturable reactors in series and said condensers in shunt, said cascade circuit having a condenser input and a saturable reactor output, the output of said cascade circuit being connected across the primary winding of said pulse transformer, said magnetron being connected across the secondary winding of said pulse transformer, a voltage source having a predetermined pulsing frequency, said voltage source being connected to said second winding of said first saturable reactor, a bias voltage source connected to said third winding of said first saturable reactor to supply magnetic flux of a predetermined amplitude and time sequence for biasing said first saturable reactor, said second winding of said second saturable reactor being connected to said bias voltage source with the proper polarity and time sequence to eliminate positive pulse peaks in the output of said pulse modulator whereby said magnetron is pulsed with a sine wave current pulse having correct amplitude, pulse width and time sequence for exciting a radar transmitter.

11. A radio frequency pulse generator comprising a first, second, and third saturable reactor, each of said saturable reactors having an active winding, the first of said saturable reactors having a primary winding and a bias winding, an alternating current voltage source having a predetermined pulsing frequency, said primary winding being connected to said alternating current voltage source to introduce voltage at the pulse frequency into said first saturable reactor, a bias current source, said bias winding being connected to said bias current source to supply a predetermined magnetic bias to said first saturable reactor, said second saturable reactor having a bias winding connected to said bias current source to magnetically bias said second saturable reactor, a first, second and third condenser, a pulse transformer, a common terminal, said first condenser being connected to the first end of said active winding of said first saturable reactor and to said common terminal, said second condenser being connected to the junction between the second end of said active winding of said first saturable reactor and the first end of said active winding of said second saturable reactor and to said common terminal, said third condenser being connected to the junction of the second end of said active winding of said second saturable reactor and the first end of said active winding of said third saturable reactor and to said common terminal, said pulse transformer being connected between the second end of said active winding of said third saturable reactor and to said common terminal, a magnetron having a cathode and plate, the secondary winding of said pulse transformer being connected between the cathode and plate of said magnetron, said plate being connected to said common terminal whereby said magnetron is pulsed at the desired frequency, amplitude, pulse width, and pulse shape for use as a radar oscillator, with very high reliability, long life, light weight, compactness, and a minimum of parts.

12. A magnetron radio frequency pulse generator comprising a plurality of condensers, electrical energy means connected to said condensers, a plurality of switching devices, said switching devices and said condensers being of equal number, a pulse transformer, a magnetron, said condensers and said switching devices connected to form a cascade circuit with said switching devices in series and said condensers in shunt, said cascade circuit having a condenser input and a switching device output, said switching devices connected to consecutively transfer energy from one said condenser to the next said condenser, the value of capacitance of said condensers and the timing of said switching devices determining the width of the output current pulses of said cascade circuit, the said condenser connected across the output of said cascade circuit being connected to be discharged by the said switching device which is in series with the output of said cascade circuit, said pulse transformer being connected across the output of said cascade circuit and said magnetron being connected across the output of said pulse transformer.

13. A radio frequency pulse generator comprising a plurality of saturable reactors, a plurality of condensers, the number of said saturable reactors and said condensers being equal, said saturable reactors each having a first winding, a pulse transformer, a magnetron, said first windings of said saturable reactors connected in series to form together with said condensers connected in shunt, a cascade circuit having a condenser input and a saturable reactor output, at least two of said saturable reactors each having a second winding, voltage means of a predetermined pulsing frequency connected to the input of said cascade circuit and bias voltage means of a predetermined magnitude and polarity connected to said second windings.

14. A radio frequency pulse generator comprising a plurality of saturable reactors, at least the first of said saturable reactors having a first, second and third winding, a plurality of condensers, the number of said condensers being equal to the number of said saturable reactors, a pulse transformer, a magnetron, all of said saturable reactors having a first winding, said first windings and said condensers being connected to form a cascade circuit with said saturable reactors in series and said condensers in shunt, said cascade circuit having a condenser input and a saturable reactor output, the output of said cascade circuit being connected across the primary winding of said pulse transformer, said magnetron being connected across the secondary winding of said pulse transformer, a voltage source having a predetermined pulsing frequency connected to said second winding of said first saturable reactor, a bias voltage source connected to said third winding of said first saturable reactor to supply magnetic flux of a predetermined amplitude and time sequence for biasing said first saturable reactor.

15. A radio frequency pulse generator comprising one saturable reactor having a first, second and third winding, one condenser, a pulse transformer, a magnetron, said first winding and said condenser being connected to form a cascade circuit with said winding in series and said condenser in shunt, said cascade circuit having a condenser input and a saturable reactor output, the output of said cascade circuit being connected across the primary winding of said pulse transformer, said magnetron being connected across the secondary winding of said pulse transformer, a voltage source having a predetermined pulsing frequency connected to said second winding of said saturable reactor, a bias voltage source connected to said third winding of said saturable reactor to supply magnetic flux of a predetermined amplitude and time sequence for biasing said reactor.

16. A magnetron radio frequency pulse generator comprising a plurality of condensers, electrical energy means connected to at least the first said condenser, a plurality of switching devices, said switching devices and said condensers being of equal number, a pulse transformer, a magnetron, said condensers and said switching devices connected to form a cascade circuit with said switching devices in series and said condensers in shunt, said cascade circuit having a condenser input and a switching device output, said switching devices being connected to consecutively transfer energy from one said condenser to the next said condenser, the value of capacitance of said condensers and the timing of said switching devices determine the width of the output current pulses of said cascade circuit, the said condenser connected across the output of said cascade circuit being connected to be discharged by the said switching device which is in series with the output of said cascade circuit, said pulse transformer being connected across the output of said cascade circuit and said magnetron being connected across the output of said pulse transformer.

17. A radio frequency pulse generator comprising a plurality of saturable reactors, a plurality of condensers, said saturable reactors each having a first winding, said first windings and said condensers being connected with said windings in series and said condensers in shunt to form a cascade circuit, a magnetron, means for coupling said circuit with said magnetron, a second winding on the first of said reactors, voltage means of predetermined plusing frequency connected to said second winding, and voltage means of a predetermined magnitude and polarity for biasing at least one of said reactors.

References Cited in the file of this patent
UNITED STATES PATENTS

| | | |
|---|---|---|
| 2,320,224 | Edwards | May 25, 1943 |
| 2,469,977 | Morrison | May 10, 1949 |
| 2,523,476 | Mittelman | Sept. 26, 1950 |
| 2,633,536 | Winter | Mar. 31, 1953 |
| 2,709,759 | Kabuss et al. | May 31, 1955 |
| 2,727,159 | Sunderlin | Dec. 13, 1955 |
| 2,780,771 | Lee | Feb. 5, 1957 |
| 2,782,867 | Hall | Feb. 26, 1957 |

FOREIGN PATENTS

| | | |
|---|---|---|
| 154,760 | Australia | Feb. 1, 1951 |